(12) United States Patent
Collotta et al.

(10) Patent No.: US 11,647,562 B2
(45) Date of Patent: *May 9, 2023

(54) CONFIGURABLE WIRELESS DEVICE NETWORK

(71) Applicant: TELECOM ITALIA S.p.A., Milan (IT)

(72) Inventors: Ivano Salvatore Collotta, Turin (IT); Gian Michele Dell'Aera, Turin (IT); Bruno Melis, Turin (IT); Davide Sorbara, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,241

(22) Filed: Dec. 1, 2021

(65) Prior Publication Data

US 2022/0095418 A1    Mar. 24, 2022

Related U.S. Application Data

(63) Continuation of application No. 16/495,915, filed as application No. PCT/EP2018/056242 on Mar. 13, 2018, now Pat. No. 11,212,872.

(30) Foreign Application Priority Data

Mar. 30, 2017    (IT) .................. 102017000035262

(51) Int. Cl.
*H04W 88/04* (2009.01)
*H04W 24/02* (2009.01)
(Continued)

(52) U.S. Cl.
CPC ........... *H04W 88/04* (2013.01); *H04W 24/02* (2013.01); *H04W 28/0236* (2013.01); *H04W 74/006* (2013.01); *H04W 74/0833* (2013.01)

(58) Field of Classification Search
CPC ..... H04W 88/04; H04W 24/02; H04W 74/00; H04W 74/08; H04L 25/03; H04B 3/54; H04B 7/0413
See application file for complete search history.

(56) References Cited

U.S. PATENT DOCUMENTS

2013/0005240 A1    1/2013    Novak et al.
2014/0213244 A1    7/2014    Oh et al.
(Continued)

FOREIGN PATENT DOCUMENTS

EP         2 903 390 A1      8/2015
WO    WO 2016/128213 A1      8/2016
(Continued)

OTHER PUBLICATIONS

International Search Report and Written Opinion dated May 4, 2018 in PCT/EP2018/056242 file Mar. 13, 2018.

*Primary Examiner* — Iqbal Zaidi
(74) *Attorney, Agent, or Firm* — Oblon, McClelland, Maier & Neustadt, L.L.P.

(57) ABSTRACT

A method for a wireless network, including a node and a first device covered by the node, the node acting as serving node for the first device, and the first device transmitting first data to the node over a first link, includes determining presence of a second device covered by the node, the second device transmitting second data to a serving node over a second link, determining radio quality of the first link, determining radio quality of the second link, and determining radio quality of a third link between the second device and the first device. If the radio quality of the third link is higher than the radio quality of the second link, the second device transmits the second data to the first device over the third link and the first device retransmits, over the first link, the second data to the node.

14 Claims, 4 Drawing Sheets

(51) Int. Cl.
    *H04W 28/02*     (2009.01)
    *H04W 74/00*     (2009.01)
    *H04W 74/08*     (2009.01)

(56) References Cited

U.S. PATENT DOCUMENTS

| | | |
|---|---|---|
| 2015/0045033 A1 | 2/2015 | Kim et al. |
| 2015/0131540 A1 | 5/2015 | Koo et al. |
| 2015/0237555 A1 | 8/2015 | Kashiwase |
| 2018/0035354 A1 | 2/2018 | Martin et al. |
| 2018/0070281 A1 | 3/2018 | Wu et al. |
| 2018/0220336 A1* | 8/2018 | Hong ................ H04W 36/0016 |

FOREIGN PATENT DOCUMENTS

| | | |
|---|---|---|
| WO | WO 2016/189392 A1 | 12/2016 |
| WO | WO 2017/030572 A1 | 2/2017 |

\* cited by examiner

CONFIGURABLE WIRELESS DEVICE NETWORK

RELATED APPLICATIONS

This application is a continuation U.S. application Ser. No. 16/495,915, filed on Sep. 20, 2019, which is a '371 National Phase of International Application No. PCT/EP2018/056242, filed on Mar. 13, 2018, which claims priority to Italian Patent Application No. 102017000035262, filed on Mar. 30, 2017. The entire disclosures of the prior applications are hereby incorporated by reference in their entirety.

BACKGROUND OF THE INVENTION

Field of the Invention

The present invention generally relates to wireless communication networks, such as cellular networks. More particularly, the present invention relates to wireless networks including "Internet of Things" devices (for example, sensor devices), hereinafter referred to as cellular sensor networks.

Overview of the Related Art

A cellular sensor network typically comprises one or more "Internet of Things" devices (i.e. non-human-oriented electronic devices with sensing/metering and internet connection capabilities, in the following referred to as sensor devices) connected to a conventional radio access network (e.g., a "Long Term Evolution" (LTE) or a "LTE-Advanced" (LTE-A) radio access network).

A cellular sensor network typically comprises a high number of low cost sensor devices intended to transmit a relatively low amount of data in a day, reason why the sensor devices (or at least most of the sensor devices) should be able to transmit and receive data also in critical positions in terms of radio conditions (e.g., basements of buildings) and to work with battery for long periods (e.g., 10 years or even more) without being connected to a power supply.

S. Ahnad et. al, "Tailoring LTE-Advanced for M2M Communication using Wireless Inband Relay Node", New York University, University of Bremen, W T C 2014, discloses a solution to integrate Relay Node in an M2M system. The Relay Node can increase the performance of the system by aggregating the data traffic generated by the sensors.

M. Saeed Al-katani, "ECSM: Energy Efficient Clustering Scheme for Mobile M2M Communication Network", University of Saudi Arabia, David C. Wyld et al. (Eds): CCSIT, SIPP, AISC, PDC, TA, NLP—2014, available at the date of filing of the present application at http://www.airccj.org/CSCP/vol4/csit41901.pdf, discloses a cluster-based scheduling approach for Mobile M2M communication where it is proposed the definition of a Primary Cluster Head (PCH) for the transmission of the control information, that is responsible for coordinating member MTC devices, collecting data from MTC devices nodes and sending the aggregate data to the MTC gateway. Also several Secondary Cluster Heads (SCH) are defined and they wake up frequently to check the energy status of the PCH. If the PCH fails due to energy shortage, the SCH with the most residual energy becomes the new PCH.

S. Nawaz Khan Marwat et al, "A Novel Machine-to-Machine Traffic Multiplexing in LTE-A System using Wireless In-band Relay", University of Bremen, D Pesch et al (Eds.): MONAMI 2013, LNICST125, pp 149-158, 2013, discloses a number of solutions to increase the effectiveness of the backhaul link used to relay the information to the Network Node (NN): data aggregation at the Relay Node, reduction of the granularity of the schedulable resources (less than 1 PRB), introduction of a Quality Aware Relay Node to handle different M2M transmissions and introduction of an efficient PDCP algorithm to multiplex multiple uplink transmissions.

S. N. Venkatasubramanian, K Haneda K. Yamamoto, "System-level Performance of In Band Full-Duplex Relaying on M2M System at 920 MHz" University of Alto and University of Kyoto, Vehicular Technology Conference (VTC Spring), 2015 IEEE 81st, discloses a Full Duplex architecture for Relay Nodes in order to increase network performance compared to the achievable one with an Half Duplex Relay Node.

WO2011136524, "Method and Apparatus for Transceiving data in a Wireless Access System", discloses a method which involves determining a relay terminal in an M2M communication system, and transceiving data to/from a base station or other terminal through the determined relay terminal, and a method for constructing frames for transceiving data in the M2M communication system. By means of the data-transceiving method, an M2M terminal can transmit/receive a signal to/from a base station or other M2M terminal, and frames of a base station and M2M terminal can be efficiently constructed. Said method comprises: receiving, by a first terminal of a wireless access system, a first message including a relay operation parameter, which is information that indicates a transmitting or receiving operation, from a base station during a downlink section and/or uplink section within a frame; and transceiving, by the first terminal, data to/from the base station or other terminal on the basis of the received relay operation parameter.

SUMMARY OF INVENTION

The Applicant has recognized that none of the cited prior-art solutions is satisfactory.

Indeed, none of the cited prior-art solutions is adapted to provide increased radio coverage and reduction of energy consumption of the sensor devices in heterogeneous and dynamic scenarios wherein the sensor devices have very different features in terms of shapes and performance (e.g., because of the place where they are located and the information they have to transmit), and wherein the sensor devices rapidly increase or decrease in number in a certain cellular sensor network.

In view of the above, the Applicant has faced the issue of increasing radio coverage while reducing energy consumption of the sensor devices, and has devised a solution for dynamically configuring data relaying of one or more sensor devices based on radio conditions experienced by them (and, preferably, based on other operative conditions and/or parameters).

Moreover, the Applicant has also found that the devised solution, although originally conceived for sensor devices for use in cellular networks, can be equivalently applied to any other "Internet of Things" device (i.e., any physical device, usually referred to as "connected device" or "smart device", or "network device", embedded with electronics, software, and network connectivity that enable it to collect and exchange data) for use in whatever wireless network (such as Wi-Fi or Bluetooth networks).

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for configuring a wireless network. The wireless network comprises a network node and a first network device under coverage of the network node, the network node acting as serving network node for the first network device, and the first network device being arranged for transmitting first data to the network node over a first radio link. The method comprises:

determining the presence of a second network device under coverage of said network node, the second network device being arranged for transmitting second data to a respective serving network node over a second radio link, determining a radio quality of the first radio link, determining a radio quality of the second radio link, determining a radio quality of a third radio link between the second network device and the first network device, and if the radio quality of the third radio link is higher than the radio quality of the second radio link, configuring the second network device to transmit the second data to the first network device over the third radio link and the first network device to retransmit, over the first radio link, said second data to the network node.

According to an embodiment of the present invention, the wireless network supports first synchronization signals and a first physical random access channel for establishing a direct connection between the first network device and the network node and between the second network device and the respective serving network node, and second synchronization signals and a second physical random access channel for establishing a direct connection between the first network device and the second network device. Said configuring the second network device to transmit the second data to the first network device over the third radio link and the first network device to retransmit, over the first radio link, said second data to the network node is carried out if the first network device supports at least transmission of the second synchronization signals and reception on the second physical random access channel, and the second network device supports at least transmission on the first physical random access channel and on the second physical random access channel and reception of the second synchronization signals.

According to an embodiment of the present invention, said determining a radio quality of a third radio link comprises:

causing the second network device to transmit, to the network node and on the first physical random access channel, requests of radio resources and the radio quality of the second radio link, causing the first network device to intercept said requests of radio resources and said radio quality of the second radio link, and causing the first network device to determine the radio quality of the third radio link based on the quality of said intercepted requests of radio resources and said intercepted radio quality of the second radio link.

According to an embodiment of the present invention, said determining a radio quality of a third radio link comprises:

causing the second network device to transmit, to the network node and on the first physical random access channel, a first set of requests of radio resources and the radio quality of the second radio link, and in presence of a feedback of the network node at the second network device about said transmitted first set of requests of radio resources:

causing the second network device to transmit subsequent requests of radio resources following the first set of requests of radio resources to the first network device on the second physical random access channel channel, and causing the first network device to determine the radio quality of the third radio link based on a quality of the received subsequent requests of radio resources.

According to an embodiment of the present invention, said determining a radio quality of a third radio link comprises:

causing the second network device to transmit, to the network node and on the first physical random access channel, a first set of requests of radio resources and the radio quality of the second radio link, and in absence of a feedback of the network node at the second network device about said first set of requests of radio resources:

causing the second network device to transmit subsequent requests of radio resources following the first set of requests of radio resources to the network node on the first physical random access channel, causing the first network device to intercept said subsequent requests of radio resources, and determining the radio quality of the third radio link based on the quality of the intercepted subsequent requests of radio resources.

According to an embodiment of the present invention, said determining the radio quality of the third radio link is also based on evaluation of the second synchronization signals transmitted from the first network device to the second network device.

According to an embodiment of the present invention, the network node acts as serving network node also for the second network device. Preferably, said configuring the second network device to transmit the second data to the first network device over the third radio link and the first network device to retransmit, over the first radio link, said second data to the network node further comprises:

causing the network node to send a first resource assignment message to the first network device and a second resource assignment message to the second network device;

causing the first network device to transmit periodically the second synchronization signals, and causing the second network device to synchronize with the first network device according to the received second synchronization signals.

According to an embodiment of the present invention, the second resource assignment message also contains the information on reserved radio resources that are reserved for Downlink and Uplink data transmission on the third radio link.

According to an embodiment of the present invention, the wireless network comprises a further network node, the further network node acting as serving network node for the second network device. Preferably, the method further comprises causing the network node to inform the further network node about the availability of the first network device to which the second network device can transmit the second data over the third radio link.

According to an embodiment of the present invention, said configuring the second network device to transmit the second data to the first network device over the third radio link and the first network device to retransmit, over the first radio link, said second data to the network node further comprises:

causing the network node to send a resource assignment message to the first network device, causing the further network node to send a resource redirection message to the second network device;

causing the first network device to transmit periodically the second synchronization signals, and causing the second network device to synchronize with the first network device according to the received second synchronization signals.

According to an embodiment of the present invention, the radio quality of the first radio link is based on the first synchronization signals from the network node to the first network device. The radio quality of the second radio link is preferably based on the first synchronization signals from the respective serving network node to the second network device.

According to an embodiment of the present invention, the method further comprises determining an energy availability of the first network device and an energy availability of the second network device. Said configuring the second network device to transmit the second data to the first network device over the third radio link and the first network device to retransmit, over the first radio link, said second data to the network node is preferably carried out if the energy availability of the first network device is higher than the energy availability of the second network device.

According to an embodiment of the present invention, said configuring the second network device to transmit the second data to the first network device over the third radio link and the first network device to retransmit, over the first radio link, said second data to the network node is carried out also based on at least one among:

an indication of a device network to which the first and second network devices belong;

an indication of a maximum transmitting power supported by the first and second network devices;

an indication about predefined transmission time periods of the first and second network devices; and an indication of position and mobility of the first and second network devices.

Another aspect of the present invention relates to a computer program product directly loadable into a memory of a computer, and comprising software code means adapted to perform the above method when run on the computer.

A further aspect of the present invention relates to a network node for use in a wireless network. The wireless network comprises a network node and a first network device under coverage of the network node, the network node acting as serving network node for the first network device, and the first network device being arranged for transmitting first data to the network node over a first radio link. The network node is arranged for:

determining the presence of a second network device under coverage of said network node, the second network device being arranged for transmitting second data to a respective serving network node over a second radio link, determining a radio quality of the first radio link, determining a radio quality of the second radio link, determining a radio quality of a third radio link between the second network device and the first network device, and if the radio quality of the third radio link is higher than the radio quality of the second radio link, configuring the second network device to transmit the second data to the first network device over the third radio link and the first network device to retransmit, over the first radio link, said second data to the network node.

A further aspect of the present invention relates to a device network for use in a wireless network. The device network comprises a first network device arranged for transmitting first data over a first radio link, and a second network device arranged for transmitting second data over a second radio link. With the first and second network devices under coverage of a network node of the cellular network, and with the network node acting as serving network node for the first network device:

if the radio quality of the third radio link is higher than the radio quality of the second radio link, the second network device is arranged for transmitting the second data to the first network device over the third radio link and the first network device is arranged for retransmitting, over the first radio link, said second data to the network node.

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein.

DETAILED DESCRIPTION OF PREFERRED EMBODIMENTS OF THE INVENTION

Figure 1:
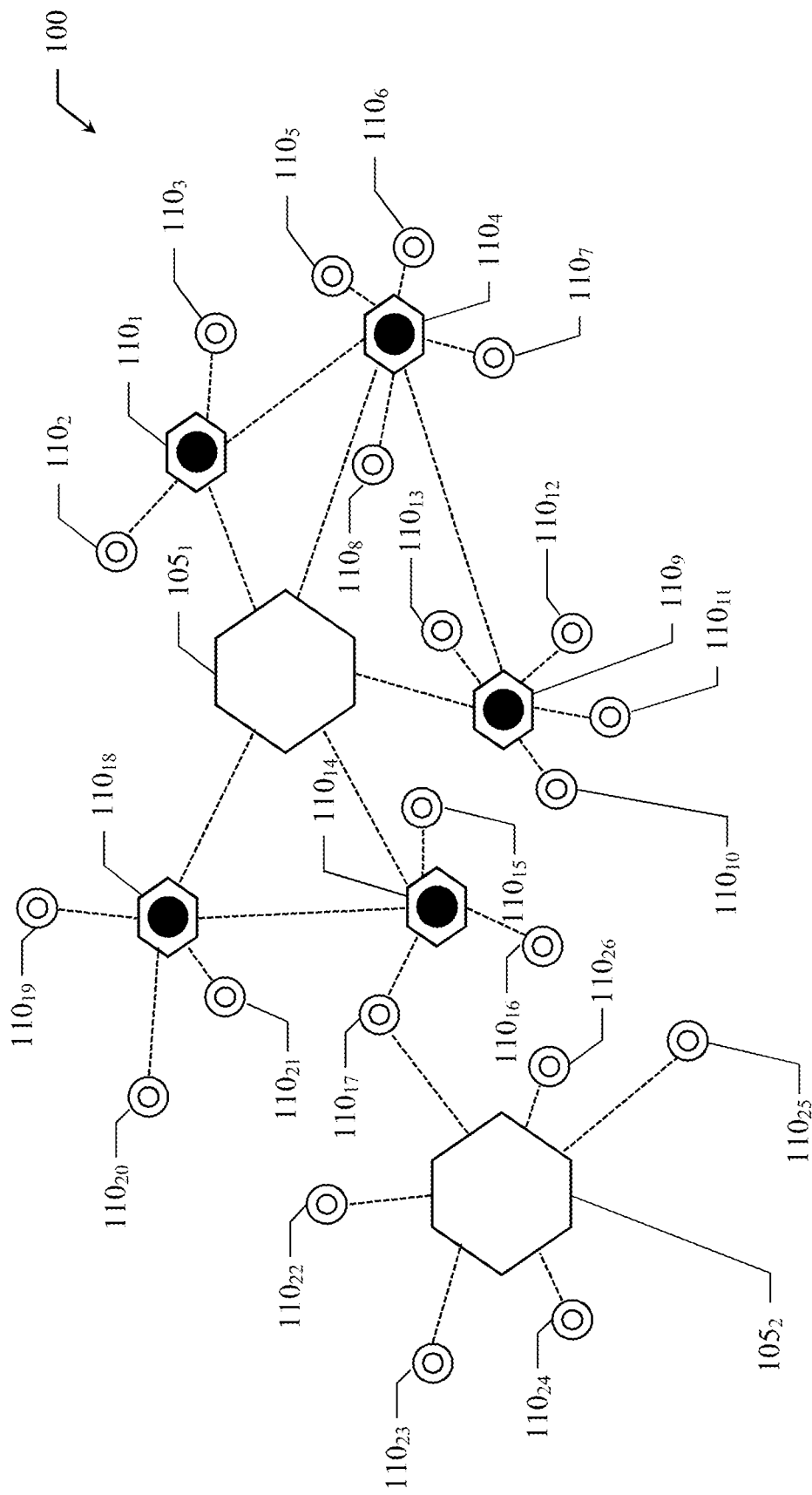
FIG. 1 shows a cellular network according to an embodiment of the present invention.

FIG. 1 shows a wireless network, for example a cellular network 100, according to an embodiment of the present invention.

The cellular network 100 comprises one or more network nodes $105_k$ (k=1, 2, 3 ..., K—with K=2 in the example at issue), such as the network nodes $105_1$, $105_2$, configured to support connections with "Internet of Things" devices $110_i$ (i=1, 2, 3 ..., I—with I=26 in the example at issue). For the purposes of the present disclosure, the "Internet of Things" devices broadly encompass physical devices (usually referred to as "connected devices" or "smart devices" or "network devices") embedded with electronics, software, and network connectivity that enable them to collect and exchange data). In the exemplary, not limiting, embodiment herein considered, the network devices $110_i$ also feature sensing/metering capabilities, therefore in the following they will be referred to as sensor devices $110_i$.

According to an exemplary embodiment of the present invention, the network node $105_k$ is a LTE/LTE-Advanced eNodeB, although this should not be construed limitatively. The network node $105_k$ is advantageously connected to other network nodes, such as to core network nodes (not shown).

In the exemplary considered scenario, the sensor devices $110_i$ comprise sensor devices (for example, the sensor devices $110_1$, $110_4$, $110_9$, $110_{14}$ and $110_{18}$) connected to a power supply or having (e.g., due to better radio conditions experienced) a high or relatively high battery charge (hereinafter referred to as higher-energy sensor devices), and sensor devices (for example, the sensor devices $110_2$, $110_3$, $110_5$-$110_8$, $110_{10}$-$110_{13}$, $110_{15}$-$110_{17}$, $110_{19}$-$110_{21}$ and $110_{22}$-$110_{26}$) not connected to a power supply or having low battery charge (hereinafter referred to as lower-energy sensor devices).

Preferably, as herein assumed, each sensor device $110_i$ (or at least one thereof) is capable of transmitting data to the serving network node $105_k$ over a direct radio communication link (hereinafter referred to as direct link) and to a different sensor device $110_i$ over a radio communication link referred to as relay link.

Moreover, in the considered scenario, the sensor devices $110_i$ are logically grouped into a number of (one or more) sensor device networks $DN_x$ (x=A, B, C, . . . ), each sensor device network $DN_x$ comprising, for example, a group of sensor devices $110_i$ (i.e., higher-energy and/or lower-energy sensor devices) with a same owner and placed in a same, limited space (this could be the case of sensor devices $110_i$ belonging to a same user).

In the exemplary scenario illustrated in FIG. 1, five sensor device networks are assumed to be associated with the network node $105_1$, namely: a sensor device network $DN_A$ comprising the higher-energy sensor device $110_1$ and the lower-energy sensor devices $110_2$ and $110_3$, a sensor device network $DN_B$ comprising the higher-energy sensor device $110_4$ and the lower-energy sensor devices $110_5$-$110_8$, a sensor device network $DN_C$ comprising the higher-energy sensor device $110_9$ and the lower-energy sensor devices $110_{10}$-$110_{13}$, a sensor device network $DN_D$ comprising the higher-energy sensor device $110_{14}$ and the lower-energy sensor devices $110_{15}$-$110_{17}$, and a sensor device network $DN_E$ comprising the higher-energy sensor device $110_{18}$ and the lower-energy sensor devices $110_{19}$-$110_{21}$.

For the sake of completeness, one or more of the sensor device networks $DN_x$ may comprise one or more additional sensor devices capable of transmitting data only to the respective serving network nodes over the direct links—these additional sensor devices being not shown in the figure as they are not relevant for the understanding of the present invention.

Broadly speaking, according to the present invention, the network node $105_k$ (preferably a unit thereof, hereinafter IoT ("Internet of Things") unit)—or, in alternative embodiments of the present invention, one or more entities of the cellular network 100 external to the network nodes $105_k$—is configured to carry out a method or procedure (hereinafter, IoT ("Internet of Things") procedure) for configuring the cellular network 100, and particularly for configuring one or more sensor devices $110_i$ (advantageously, one or more higher-energy sensor devices $110_i$) to perform data relaying on behalf of one or more other sensor devices $110_i$ (advantageously, one or more lower-energy sensor devices $110_i$) according to a radio quality of the respective direct and relay links.

In the following, each sensor device $110_i$ selected to perform data relaying (on behalf of one or more other sensor devices $110_i$) will be referred to as network additional node, whereas each sensor device $110_i$ supported with data relaying (i.e., each sensor device $110_i$ receiving or taking advantage of data relaying—or, otherwise stated, each sensor $110_i$ on behalf of which data relaying is carried out) will be referred to as supported sensor device $110_i$.

The radio quality of the direct links between each sensor device $110_i$ and the associated network node $105_k$ allows distinguishing sensor devices experiencing better radio conditions from sensor devices experiencing worse radio conditions (so that only the sensor devices experiencing better radio conditions are taken into consideration for performing data relaying, and only the sensor devices experiencing worse radio conditions are taken into consideration for being supported with data relaying). In the following, by sensor device $110_i$ experiencing better radio conditions it is meant a sensor device $110_i$ having to perform a low, or relatively low, number of radio transmission attempts (for example, a number of radio transmissions attempts lower than a statically or dynamically predetermined first number of radio transmissions) to achieve connection (e.g., successful transmission of data) to the network node $105_k$ (such as a sensor device $110_i$ located in places with low (or relatively low) signal attenuation (e.g., outdoors)), and by sensor device $110_i$ experiencing worse radio conditions it is meant a sensor device $110_i$ having to perform a high, or relatively high, number of radio transmissions (for example, a number of radio transmissions higher than a statically or dynamically predetermined second number of radio transmission attempts, preferably equal to or higher than the first number of radio transmissions attempts) to achieve connection (e.g., successful transmission of data) to the network node $105_k$ (such as a sensor device $110_i$ located in places with high (or relatively high) signal attenuation (e.g., basements of buildings)).

For the purposes of the present disclosure, by data relaying it is meant a rebroadcasting of the received data to extend the broadcast reach. In other words, a first sensor device $110_i$ carrying out data relaying on behalf of a second sensor device $110_i$ interconnects the second sensor device $110_i$ to the serving network node $105_k$ by receiving data from the second sensor device $110_i$ over the relay link (between the first and second sensor devices $110_i$) and by rebroadcasting the received data to the serving network node $105_k$ over the direct link (between the first sensor device $110_i$ and the serving network node $105_k$).

Figure 2:
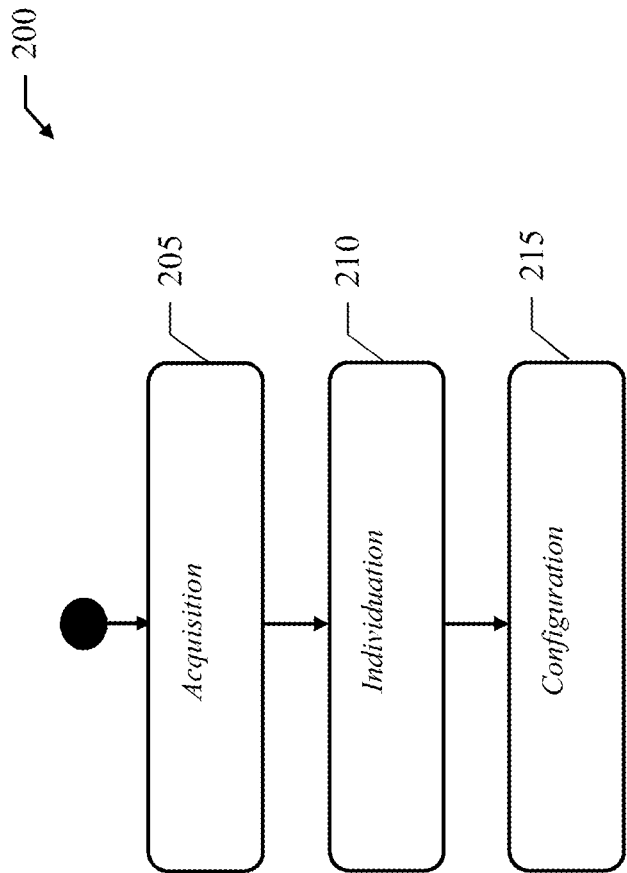
FIG. 2 is a schematic diagram showing, in terms of functional modules, a procedure for configuring the cellular network, according to an embodiment of the present invention.

With reference now to FIG. 2, an IoT procedure 200 according to an embodiment of the present invention is schematically shown in terms of functional modules. It is pointed out that the use of the term "module" is herein intended to emphasize functional (rather than implementation) aspects thereof. Indeed, without losing of generality, each module may be implemented by software (in which case, the resulting IoT procedure 200 would be performed by proper code means included in a computer program, when the program is run on a computer), hardware, and/or a combination thereof. Moreover, the modules may also reflect, at least conceptually, the physical structure of the network node $105_k$ (or of its IoT unit). However, the modules may have, by the physical viewpoint, distributed nature, it being understood that, by the logical viewpoint, they are all part of that IoT unit, wherever (and in whichever way) their physical implementation actually takes place. According to an embodiment of the present invention, and as herein assumed from now on, an IoT unit physically residing in each network node $105_k$ is provided.

As visible in FIG. 2, the IoT procedure 200 comprises three phases, broadly summarized herebelow and better discussed in the following:

acquisition phase (module 205): acquisition by each network node $105_k$ of information (hereinafter, sensor device information) about each sensor device $110_i$ associated with (e.g., served by) that network node $105_k$;

recognition phase (module 210): identification, among the sensor devices $110_i$, of candidate network additional nodes (preferably according to the sensor device information (or a part thereof)), discovery of candidate supported sensor devices on behalf of which the candidate network additional nodes can potentially perform data relaying, and election, among the candidate network additional nodes and the candidate supported sensor devices associated therewith, of network additional nodes and supported sensor devices according to a radio quality of the direct and relay links between the sensor devices and the associated network nodes and between the supported sensor devices and the associated network additional nodes, respectively. Preferably, the radio quality is determined (e.g., measured and/or estimated) based on synchronization signals, hereinafter SS signals (and/or, according to alternative embodiments of the present invention, based on different signals, such as reference signals), and more preferably the determined radio quality is received via the physical random access channel (hereinafter, PRACH channel). The radio quality measures performed by the network devices on the SS signals or on the reference signals (RS) may include for example measures of "Signal to Interference plus Noise Ratio" (SINR), received signal power (e.g., the "Reference Signal Received Power"—RSRP) or received signal quality (e.g., the "Reference Signal Received Quality"—RSRQ). Even more preferably, the SS signals comprise primary SS signals (hereinafter P-SS signals), which are transmitted by the network node $105_k$ to each sensor device, and secondary SS signals (hereinafter S-SS signals), which are transmitted by a candidate network additional node to each candidate supported sensor device, and the PRACH channel comprises a primary physical random access channel (hereinafter P-PRACH channel) for transmitting the radio quality of the direct link (other than for sending transmission requests) to the network node $105_k$ and a secondary physical random access channel (hereinafter S-PRACH channel) for transmitting the radio quality of the relay link (other than for sending transmission requests) to the network additional node—in other words, the P-SS signals and P-PRACH channels are used to establish (and, preferably, maintain) a direct connection between the sensor devices $110_i$ and the associated network node $105_k$, whereas the S-SS signals and S-PRACH channels are used to establish (and, preferably, maintain) a direct connection between the supported sensor devices $110_i$ and the network additional nodes; and configuration phase (module 215): configuration, by the network node $105_k$, of the network additional nodes and of the supported sensor devices.

Acquisition Phase

Broadly speaking, the sensor device information comprises information about conditions and functionalities of each sensor device $110_i$.

Preferably, each sensor device $110_i$ transmits the sensor device information to the associated network node $105_k$ during its first connection to it—in any case, as will be better appreciated from the following discussion of exemplary sensor device information, some sensor device information is advantageously updated during sensor device $110_i$ life.

According to an embodiment of the present invention, the sensor device information comprises at least one (preferably, all) among:

Group ID, i.e. an identifier that allows the network node $105_k$ to identify a sensor device network $DN_x$ to which each sensor device $110_i$ belongs. The sensor devices $110_i$ having the same sensor device information "Group ID" may share data traffic and energy consumption profiles, as they belong to a same sensor device network $DN_x$. Indeed, in the exemplary case of a sensor device network $DN_x$ having a group of sensor devices $110_i$ belonging to a same user, the common interest of maximizing the duration of the battery of each sensor device $110_i$ powered by a battery and, in general, of minimizing the overall energy consumption of all the sensor devices $110_i$ belonging to that sensor device network $DN_x$ is expected to be pursued. The sensor device information "Group ID" may be considered as a static sensor device information—i.e. an information that does not change over time and that is transmitted only during a registration of the sensor device $110_i$ (for example, during its first connection to the network node $105_k$);

Supported Channels and Signals, i.e. the physical channels and signals that the sensor device $110_i$ supports for data transmission and/or reception, the physical channels and signals including for example the P-PRACH channel, the S-PRACH channel, the P-SS signals, the S-SS signals, the physical downlink control channel (hereinafter PDCCH channel), the physical uplink control channel (hereinafter PUCCH channel), the physical broadcast channel (hereinafter PBCH channel) or a subset thereof. As better understood in the following discussion of preferred embodiments of the present invention, the physical channels and signals that each sensor device $110_i$ supports for data transmission and/or reception may be used by the network node $105_k$ to discriminate the sensor devices $110_i$ eligible as candidate network additional nodes from the sensor devices $110_i$ not eligible as candidate network additional nodes. The sensor device information "Supported Channels and Signals" may be considered as a static sensor device information—i.e. an information that does not change over time and that is transmitted only during a registration of the sensor device $110_i$ (for example, during its first connection to the network node $105_k$);

Connected, i.e. an indication (for example, a flag) indicating the connection of the sensor device $110_i$ to a power supply (for example, the flag could instead indicate the connection of the sensor device $110_i$ to a battery). In other words, the sensor device information "Connected" allows distinguishing, among the sensor devices $110_i$ of the cellular network 100, those sensor devices $110_i$ that can be considered as higher-energy sensor devices from those sensor devices $110_i$ that should be considered as lower-energy sensor devices. As better understood in the following discussion of preferred embodiments of the present invention, the sensor device information "Connected" may be used by the network node $105_k$ to discriminate the sensor devices $110_i$ eligible as candidated network additional nodes from the sensor devices $110_i$ not eligible as candidate network additional nodes (indeed, when a sensor device is connected to a power supply, the energy consumption is not a relevant issue, so that it is potentially eligible as a candidate network additional node). The sensor device information "Connected"

may be considered as a dynamic IoT device information—i.e. an information that changes over time—so that periodic updating thereof is advantageously provided;

Battery Level, i.e. an indication of the level of the battery charge of those sensor devices $110_i$ connected to a battery (instead of a power supply). Preferably, the sensor device information "Battery Level" allows distinguishing, among the sensor devices $110_i$ connected to a battery, those sensor devices $110_i$ that, having a high or relatively high level of battery charge (for example, higher than a first level of battery charge), can be considered as higher-energy sensor devices, and those sensor devices $110_i$ that, having a low or relatively low level of battery charge (for example, lower than a second level of battery charge, advantageously lower than the first level of battery charge) can be considered as lower-energy sensor devices. Together with the above sensor device information "Connected", the sensor device information "Battery Level" provides an information about energy availability of the sensor devices $110_i$, and may be used by the network node $105_k$ to discriminate the sensor devices $110_i$ eligible as candidated network additional nodes from the sensor devices $110_i$ not eligible as candidate network additional nodes (indeed, when a sensor device has a relatively high battery charge the energy consumption is not a relevant issue, so that it is potentially eligible as a candidate network additional node). The IoT device information "Battery Level" may be considered as a dynamic IoT device information—i.e. an information that changes over time—so that periodic updating thereof is advantageously provided;

Transmission Class, i.e. an indication of the maximum transmitting power supported by the sensor device $110_i$. According to the specific implementation, the sensor device information "Transmission Class" may be considered, preferably in combination with one or more other sensor device information, a discriminant for determining the election of a candidate network additional node into a network additional node and/or the election of a candidate supported sensor device into a supported sensor device. The sensor device information "Transmission Class" may be considered as a static sensor device information—i.e. an information that does not change over time and that is transmitted only during a registration of the sensor device $110_i$ (for example, during its first connection to the network node $105_k$);

Data Upload Period, i.e. an indication about the predefined time period (if any) within which the sensor device $110_i$ is pre-configured to transmit data. The sensor device information "Data Upload Period" can help the network node $105_k$ to predict the activation of the sensor device $110_i$ and to pre-allocate the needed radio resources for the data transmission. The sensor device information "Data Upload Period" may be considered as a static sensor device information—i.e. an information that does not change over time and that is transmitted only during a registration of the sensor device $110_i$ (for example, during its first connection to the network node $105_k$). As should be understood, some sensor devices like for example those used to trigger alarms (e.g., fire, smoke, flooding, intrusion, tamper) may lack the sensor device information "Data Upload Period", because their transmission is typically asyncronous and not predictable.

Supported Mobility, i.e. an indication (for example, a flag) indicating whether the sensor device $110_i$ is placed in a fixed position or it can be moved over time (e.g., during subsequent data transmissions). According to the specific implementation, the sensor device information "Supported Mobility" may be considered, preferably in combination with one or more other sensor device information, a discriminant for determining the election of a candidate network additional node into a network additional node and/or the election of a candidate supported sensor device into a supported sensor device. The sensor device information "Supported Mobility" may be considered as a dynamic sensor device information—i.e. an information that changes over time—so that periodic updating of thereof is advantageously provided.

The above IoT device information are only examples, and other sensor device information may be foreseen to better identify the sensor devices potentially eligible as candidate network additional nodes and the sensor devices actually needing data relaying (or for which data relaying is appropriate), it being understood that the relevance of each sensor device information may depend on specific policies (not limitative for the present invention). By way of example only, the IoT device information of a sensor device $110_i$ may comprise (additionally or alternatively to the above sensor device information) security information about that sensor device $110_i$ (e.g., a sensor device $110_i$ may be involved in carrying sensible data), and the policy of forcing that sensor device $110_i$ to be directly connected to the associated network node $105_k$ without data relaying, and independently of the other sensor device information, could be contemplated.

According to an embodiment of the present invention, the acquisition phase of sensor device information comprises sending, by the network node $105_k$, a request message to the associated sensor devices $110_i$ (e.g., on the PBCH or the PDCCH channels), in response to which the sensor device information is transmitted by the sensor devices $110_i$ to the associated network node $105_k$ (e.g., on the PUCCH or the PRACH channels).

Recognition Phase

Figure 3:
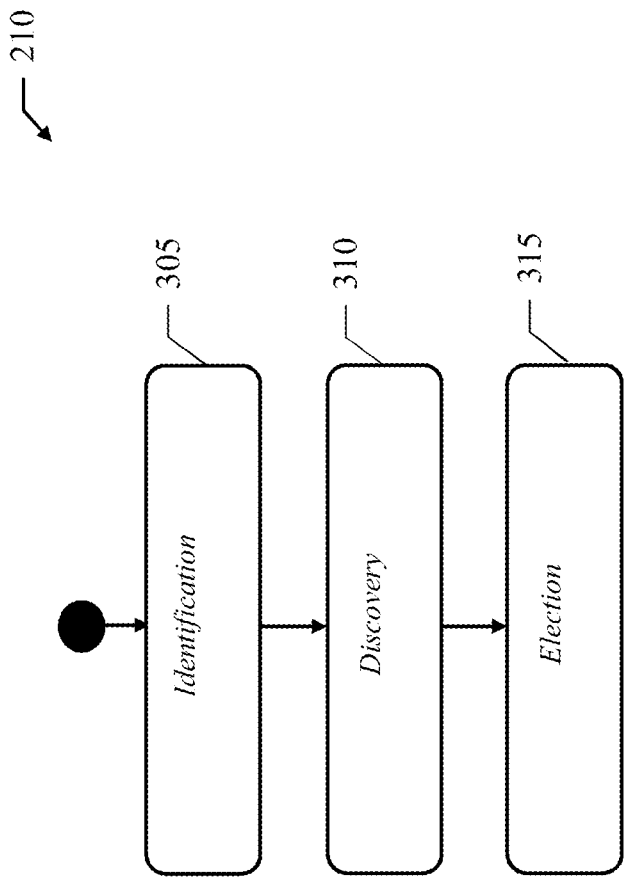
FIG. 3 is a schematic diagram showing, in terms of functional modules, of a discovery phase of said procedure according to an embodiment of the present invention.

As visible in FIG. 3, which shows a schematic diagram of the recognition phase 210 according to an embodiment of the present invention, the recognition phase 210 comprises at least one among (preferably, all) the steps discussed herebelow.

1) Identification step 305: one or more candidate network additional nodes and one or more candidate supported sensor devices are identified among the sensor devices $110_i$, preferably according to the sensor device information (or a part thereof). According to an embodiment of the present invention, a first sensor device $110_i$ is identified as a candidate network additional node if (e.g., according to the sensor device information "Supported Channels and Signals") it supports data transmission of the S-SS signals and data reception on the P-PRACH and S-PRACH channels (or at least data reception on the S-PRACH channel), and a second sensor device $110_i$ is identified as a candidate supported sensor device for that candidate network additional node if (e.g., according to the sensor device information "Supported Channels and Signals") it supports data transmission on the P-PRACH and S-PRACH channels and data reception of the S-SS signals besides the P-SS signals.

Additionally (as in the preferred embodiment herein considered), or alternatively, a first sensor device $110_i$ is identified as a candidate network additional node if (e.g., according to the sensor device information "Connected" and "Battery Level"), it is a higher-energy sensor device, and a second sensor device $110_i$ is identified as a candidate supported sensor device for that candidate network additional node if (e.g., according to the sensor device information "Connected" and "Battery Level") it is a lower-energy sensor device. More generally, a first sensor device $110_i$ may be identified as a candidate network additional node for a second sensor device (which thus becomes a candidate supported sensor device for that candidate network additional node) if the energy availability of the first sensor device $110_i$ is higher than the energy availability of the second sensor device $110_i$ (which translates, in case of both first and second sensor devices powered by a battery, in the condition of battery level of the first sensor device higher than the first level of battery charge and battery level of the second sensor device lower than the second level of battery charge, wherein the second level of battery charge is at most equal or lower than the first level of battery charge).

2) Discovery step 310: for each network node $105_k$, an indication of a radio quality of each direct link between each sensor device and that network node $105_k$ (hereinafter, direct link radio quality) and an indication of a radio quality of each relay link between each candidate supported sensor device and the associated candidate network additional node (hereinafter, relay link radio quality) are received at that network node $105_k$. In order to achieve that:

according to a first embodiment of the present invention (referred to as autonomous discovery step), each sensor device $110_i$ is configured to send, to the network node $105_k$ and on the P-PRACH channel, requests of radio resources for data transmission (transmission attempts) and, preferably, the direct link radio quality (the direct link radio quality of each sensor device $110_i$ being preferably based on the P-SS signals from the network node $105_k$ and previously received at that sensor device $110_i$), whereas the (or each) candidate network additional node is configured to listen (i.e., to intercept), e.g. for a predetermined period (hereinafter referred to as listening period, and preferably configured by higher network layers), the transmission attempts and the direct link radio quality, and then to signal them to the network node $105_k$ together with relay link radio quality. The relay link radio quality of the relay link between each candidate supported sensor device and the associated candidate network additional node is preferably based on the quality of the reception, at the candidate network additional node, of the transmission attempts and of the direct link radio quality directed to the network node $105_k$ and intercepted by the candidate network additional node. Additionally or alternatively, the relay link radio quality of the relay link between each candidate supported sensor device and the associated candidate network additional node is based on the S-SS signals transmitted from the candidate network additional node to the candidate supported sensor device;

according to a second embodiment of the present invention (referred to as assisted discovery step), additional or alternative to the first embodiment, each sensor device $110_i$ is configured (e.g., by the network node $105_k$) to send, on the P-PRACH channel, the first transmission attempt together with the direct link radio quality to the network node $105_k$ (the direct link radio quality of the direct link between the network node $105_k$ and each sensor device $110_i$ being preferably based on the P-SS signals from the network node $105_k$ and received at the sensor device $110_i$), and, in presence of a feedback about said first transmission attempt, the sensor device $110_i$ is configured (e.g., by the network node $105_k$) to perform the subsequent transmission attempts to the candidate additional network node on the S-PRACH channel together with the relay link radio quality (the relay link radio quality being preferably based on the S-SS signals from the candidate network additional node received by the sensor device $110_i$). Preferably, since multiple sensor devices $110_i$ are configured with a S-PRACH channel, after a predetermined time-out period the sensor devices $110_i$ that did not receive a feedback about their transmission attempts (provided earlier on the S-PRACH channel) can fall back to a new transmission attempt (or more thereof) on the P-PRACH channel.

Preferably, regardless of the used (autonomous or assisted) discovery step, sensor devices $110_i$ associated with different network nodes $105_k$ can be handled by a single candidate network additional node. This could be the case of, for example, a candidate network additional node that discovers in its proximity (i.e., it receives the transmission attempts from) a sensor device $110_i$ that is under the coverage of a network node $105_k$ different from the serving network node for that candidate network additional node— hereinafter referred to as non-serving network node. In the exemplary scenario of FIG. 1 wherein the network node $105_2$ acts as serving network node for the sensor device $110_{17}$ and the network node $105_1$ acts as serving network node for the sensor device $110_{14}$, this could be the case of, for example, the sensor device $110_{14}$ that discovers in its proximity (i.e., it receives the transmission attempts from) the sensor device $110_{17}$ (in which case the network node $105_2$ acts as non-serving network node for the sensor device $110_{14}$). A candidate network additional node may discover in its proximity a sensor device $110_i$ (hereinafter external sensor device) that is under the coverage of a network node $105_k$ different from the serving network node (i.e., non-serving network node) for that candidate network additional node when, for example, the two network nodes are coordinated and are able to configure the same radio resources for the P-PRACH or for the S-PRACH channels. In this case, the candidate network additional node may receive the relay link radio quality from the external sensor device on the P-PRACH channel (autonomous discovery step) or on the S-PRACH channel (assisted discovery step). Since the candidate network additional node ignores that the external sensor device is served by a different network node $105_k$, the relay link radio quality may be reported by the candidate network additional node to its own serving network node (i.e., the network node that is serving the candidate network additional node), which in turn may route to the correct network node $105_k$ the reported relay link radio quality.

3) Election step 315: the (or each) candidate network additional node and the related supported sensor device are elected (preferably, by the network node $105_k$) as network additional node and supported sensor device, respectively, according to the radio quality of the respective direct and relay links. According to an embodiment of the present invention, each candidate network additional node and a related candidate supported sensor device are elected as network additional node and supported sensor device, respectively, based on a comparison between the associated relay link and direct link radio quality. For example, each candidate network additional node and a related candidate supported sensor device are elected as network additional node and supported sensor device, respectively, if said comparison results in a quality of the relay link between that candidate supported sensor device and that candidate network additional node higher than the quality of the direct link between that candidate supported sensor device and the network node $105_k$. Preferably, although not necessarily, the election of the (or each) candidate network additional node and the related candidate supported sensor device(s) as network additional node and supported sensor device(s), respectively, takes place by means of a cell reselection message sent from the network node $105_k$ to each network additional node and supported sensor device so as to inform them of their election for data relaying.

Therefore, according to the preferred embodiment discussed above of the IoT procedure 200, one or more higher-energy sensor devices experiencing better radio conditions are selected to relay the data of respective one or more lower-energy sensor devices experiencing worse radio conditions to the associated network node $105_k$—as opposed to conventional cellular networks including sensor devices, wherein the lower-energy sensor devices experiencing worse radio conditions are instead connected directly only to the associated network node.

This helps reducing the number of radio transmission attempts and of the power consumption of the (e.g., lower-energy) sensor devices experiencing worse radio conditions, which, instead of being connected directly to the network node $105_k$, are connected to a proper (e.g., higher-energy) sensor device which relays the data to the network node $105_k$ using a higher efficient radio link.

Figure 4:
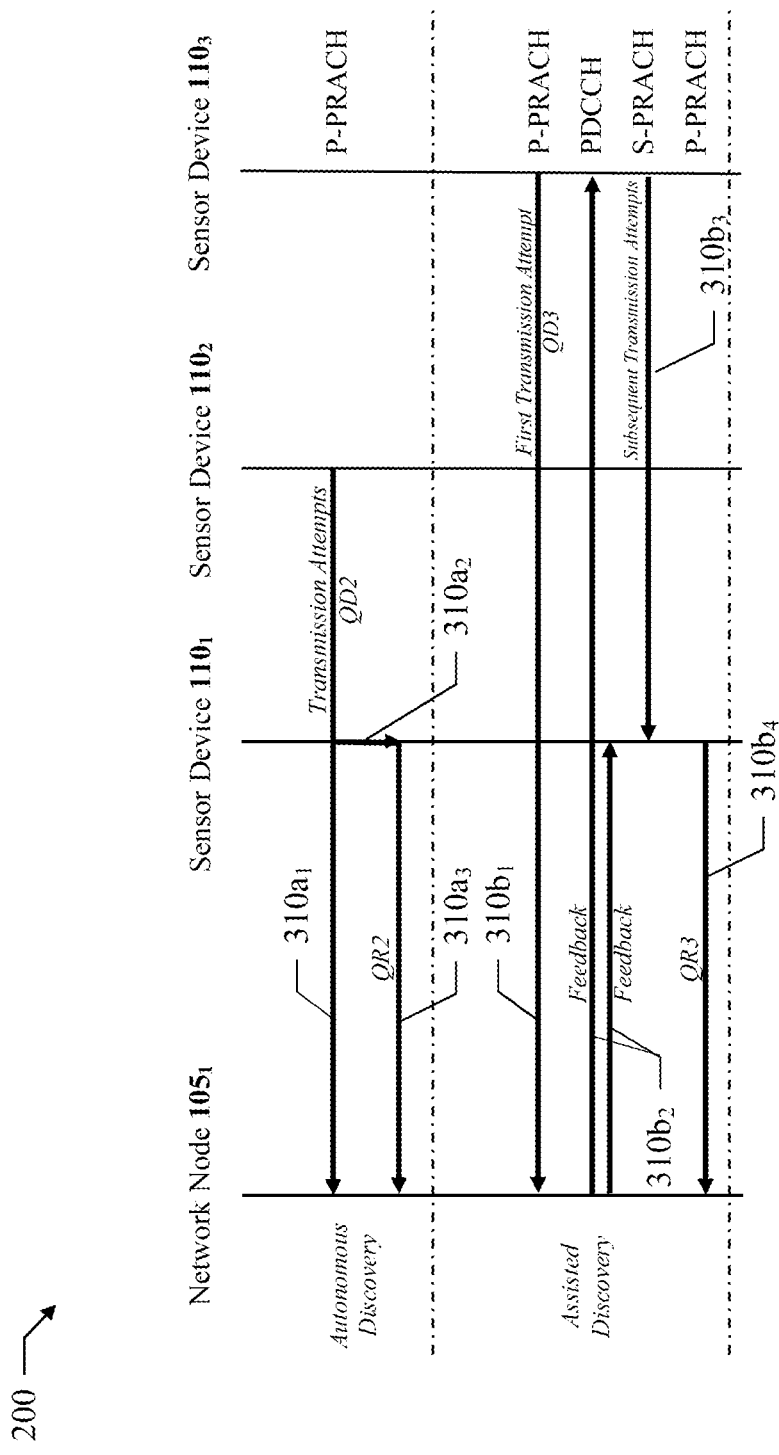
FIG. 4 is a simplified swim-lane representation of a recognition phase of said procedure according to an embodiment of the present invention.

FIG. 4 is a simplified swim-lane representation of the recognition phase 210, and particularly of the autonomous and assisted discovery steps, according to an embodiment of the present invention. For ease of description and representation, only the network node $105_1$ is considered and only a subset of the sensor devices $110_i$ associated with the network node $105_1$ are considered (for example, the sensor devices $110_1$-$110_3$), it being understood that the recognition phase is advantageously intended to be carried out at each network node $105_k$ and involve all the sensor devices $110_i$ associated therewith (as well as those in proximity thereto, as discussed above in connection with the case of sensor devices $110_i$ associated with different network nodes $105_k$ but handled by a single candidate network additional node).

In the example of FIG. 4 the sensor device $110_1$ is assumed to be the candidate network additional node and the sensor devices $110_2$ and $110_3$ are assumed to be the candidate supported sensor devices (in any case, as mentioned above, according to specific policies, the relevance of one or more sensor device information may also involve that one or more sensor devices $110_i$ of a sensor device network $DN_x$ are regarded neither as candidate network additional nodes nor as candidate supported sensor devices). In addition, only the sensor devices $110_1$ and $110_3$ are assumed to support data transmission on both P-PRACH and S-PRACH channels, whereas the sensor device $110_2$ is assumed to support data transmission only on the P-PRACH channel (reason why the network node $105_1$ and the candidate network additional node $110_1$ are assumed to carry out the autonomous discovery step for the candidate supported node $110_2$ and the assisted discovery step for the candidate supported node $110_3$).

The autonomous discovery step of the example of FIG. 4 can be summarized as follows.

The network node $105_1$ receives, on the P-PRACH channel, the transmission attempts of the candidate supported sensor device $110_2$ (step $310a_1$) together with the direct link radio quality relating to the direct link between the network node $105_1$ and the candidate supported sensor device $110_2$ (denoted by "QD2" in the figure). During the predetermined listening period, the candidate network additional node $110_1$ intercepts (i.e., receives) these transmission attempts (step $310a_2$) and determines the relay link radio quality (relating to the relay link between the candidate supported sensor device $110_2$ and the candidate network additional node $110_1$) according to the quality of the intercepted transmission attempts. At a later time, the candidate network additional node $110_1$ reports (step $310a_3$) to the network node $105_1$ the relay link radio quality (denoted by "QR2" in the figure).

The assisted discovery step of the example of FIG. 4 can be summarized as follows.

The network node $105_1$ receives, preferably on the P-PRACH channel, a first transmission attempt (or a first set of transmission attempts) from the candidate supported sensor device $110_3$, together with the direct link radio quality relating to the direct link between the network node $105_1$ and the candidate supported sensor device $110_3$ (denoted by "QD3" in the figure)—step $310b1$.

Then, the network node $105_1$ sends, preferably on the PDCCH channel, a feedback about said first transmission attempt (step $310b_2$). Preferably, as illustrated, the network node $105_1$ sends the feedback to the candidate supported sensor device $110_3$, said feedback preferably comprising configuration signalling for configuring the candidate supported sensor device $110_3$ to transmit the subsequent transmission attempts (or a set of transmission attempts following the first transmission attempt or the first set of transmission attempts) to the candidate network additional node $110_1$ (rather than to the network node $105_1$), and preferably on the S-PRACH channel—step $310b_3$. More preferably, the network node $105_1$ sends said feedback also to the candidate network additional node $110_1$, and even more preferably said feedback also comprises configuration signalling for configuring the candidate network additional node $110_1$ to determine, according to the quality of the received subsequent transmission attempts, the relay link radio quality relating to the relay link between the candidate supported sensor device $110_3$ and the candidate network additional node $110_1$. At a later time, the candidate network additional node $110_1$ reports to the network node $105_1$ the relay link radio quality (denoted by "QR3" in the figure) of the relay link between the candidate supported sensor device $110_3$ and the candidate network additional node $110_1$—step $310b4$.

Preferably, in absence of said feedback from the network node $105_1$ at the candidate supported sensor device $110_3$ (e.g., after a predetermined time-out period from the transmission attempts), the candidate supported sensor device $110_3$ may be configured (e.g., by the network node $105_1$) to transmit (i.e., to keep on transmitting) the subsequent transmission attempts to the network node $105_1$ on the P-PRACH channel, and the candidate network additional node $110_1$ may be configured (e.g., by the network node $105_1$) to intercept (e.g., for a predetermined listening period) said subsequent transmission attempts, and to determine the relay link radio quality relating to the relay link between the candidate supported sensor device $110_3$ and the candidate network additional node $110_1$ according to the quality of the intercepted subsequent transmission attempts—in other words, as mentioned above, after a predetermined time-out period, the sensor devices $110_i$ that did not receive a feedback about their transmission attempts on the S-PRACH channel fall back to a new transmission attempt (or more thereof) on the P-PRACH channel. At a later time, the candidate network additional node $110_1$ reports to the network node $105_1$ the relay link radio quality measurements.

Configuration Phase

The configuration phase 215 comprises at least one among (preferably, all) the steps discussed herebelow:

a resource assignment message is sent by the network node $105_k$, preferably both to the network additional node and to each related supported sensor device. Preferably, the resource assignment message is transmitted on the PDCCH channel. Advantageously, the resource assignment message also contains the information on the radio resources reserved for Downlink and Uplink data transmission on the relay link. More advantageously, the reserved radio resources comprise a group of radio resources specifically identified as able to reduce power consumption during data transmission and/or reception—in any case, when the S-SS signals and S-PRACH channels are used, the P-SS signals and P-PRACH channel configurations are preferably held in a memory of the sensor device (especially during sleep periods thereof), such that when a sensor device wakes up after a relatively long sleep (e.g. several hours) and the S-SS signals and S-PRACH channel configurations (for that sensor device) are meanwhile changed (e.g., due to changes in the cellular network configuration because of sensor device mobility or changed propagation conditions), a loss of connectivity for that sensor device can be avoided by using the P-SS signals and P-PRACH channels as fall back assuming that the sensor device is still camped on the same network node; and the network additional node starts to transmit periodically the S-SS signals, which are received by the supported sensor device and used to carry out synchronization with the network additional node.

Therefore, when the supported sensor device tries to perform radio resource requests on the S-PRACH channel, the connection is handled directly by the network additional node, which can schedule the supported sensor device in the radio resources of the PUSCH/PDSCH channels reserved during the previous step and signalled using the resource assignment message, thereafter the received message from the supported sensor device is preferably relayed from the network additional node to the network node $105_k$ using the radio resources of the PUSCH channel normally scheduled by the network node $105_k$.

Back to the scenario discussed above of a (candidate) network additional node (the sensor device $110_{14}$, in the example at issue) that discovers in its proximity a sensor device (or external sensor device, such as the sensor device $110_{17}$ in the example at issue) that is under the coverage of a network node (the network node $105_2$ in the example at issue) different from the network node (the network node $105_1$ in the example at issue) acting as serving network node for that candidate network additional node (non-serving network node $105_2$ and serving network node $105_1$, respectively), the decision between the direct link and the relay link for data transmission/reception (i.e., the decision of whether the (candidate) network additional node having discovered the external sensor device may in turn act as additional network node also for that external sensor device) is preferably taken by the network node $105_k$ that receives the transmission attempts from the sensor device $110_i$ on the P-PRACH channel (i.e., the non-serving network node $105_2$ in the example at issue), preferably after being informed by the serving network node ($105_i$ in the example at issue) about the availability of a candidate network additional node ($110_{14}$ in the example at issue) connected to the same serving network node ($105_1$ in the example at issue) providing the above information to the non-serving network node ($105_2$ in the example at issue). In case that a relay link for data transmission is decided for the external sensor device (i.e., the (candidate) network additional node having discovered the external sensor device is selected as network additional node for that external sensor device), both non-serving and serving network nodes (or one or more higher hierarchical decision units) decide about the radio resources to reserve for the channels of the relay link (e.g., S-SS signals and S-PRACH channels), thereafter the serving network node sends a respective resource assignment message to the network additional node (so as to inform it will act as the network additional node for the external sensor device) and the non-serving network node sends a respective resource redirection message to the external sensor device (that is, external from the serving network node viewpoint) to inform it about the P-SS signals and P-RACH channels of the serving network node and about data relaying carried out by the associated network additional node on behalf of it (providing the external sensor device with the corresponding S-SS signals and S-PRACH channels).

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

The invention claimed is:

1. A method for configuring a wireless network, wherein the wireless network comprises a network node and a first network device under coverage of the network node, the network node acting as serving network node for the first network device, and the first network device being arranged for transmitting first data to the network node over a first radio link, wherein the method comprises:

determining the presence of a second network device under coverage of said network node, the second network device being arranged for transmitting second data to a respective serving network node over a second radio link, determining a radio quality of the first radio link, determining a radio quality of the second radio link, determining a radio quality of a third radio link between the second network device and the first network device, and in response to the radio quality of the third radio link being higher than the radio quality of the second radio link, configuring the second network device to transmit the second data to the first network device over the third radio link and the first network device to retransmit, over the first radio link, said second data to the network node, wherein the wireless network supports first synchronization signals and a first physical random access channel for establishing a direct connection between the first network device and the network node and between the second network device and the respective serving network node, and second synchronization signals and a second physical random access channel for establishing a direct connection between the first network device and the second network device, and wherein said configuring the second network device to transmit the second data to the first network device over the third radio link and the first network device to retransmit, over the first radio link, said second data to the network node is carried out if the first network device supports at least transmission of the second synchronization signals and reception on the second physical random access channel, and the second network device supports at least transmission on the first physical random access channel and on the second physical random access channel and reception of the second synchronization signals.

2. The method according to claim 1, wherein said determining a radio quality of a third radio link comprises:

causing the second network device to transmit, to the network node and on the first physical random access channel, requests of radio resources and the radio quality of the second radio link, causing the first network device to intercept said requests of radio resources and said radio quality of the second radio link, and causing the first network device to determine the radio quality of the third radio link based on the quality of said intercepted requests of radio resources and said intercepted radio quality of the second radio link.

3. The method according to claim 2, wherein determining the radio quality of the third radio link is also based on evaluation of the second synchronization signals transmitted from the first network device to the second network device.

4. The method according to claim 2, wherein the radio quality of the first radio link is based on the first synchronization signals from the network node to the first network device, and wherein the radio quality of the second radio link is based on the first synchronization signals from the respective serving network node to the second network device.

5. The method according to claim 1, wherein said determining a radio quality of a third radio link comprises:

causing the second network device to transmit, to the network node and on the first physical random access channel, a first set of requests of radio resources and the radio quality of the second radio link, and in presence of a feedback of the network node at the second network device about said transmitted first set of requests of radio resources:

causing the second network device to transmit subsequent requests of radio resources following the first set of requests of radio resources to the first network device on the second physical random access channel channel, and causing the first network device to determine the radio quality of the third radio link based on a quality of the received subsequent requests of radio resources.

6. The method according to claim 1, wherein said determining a radio quality of a third radio link comprises:

causing the second network device to transmit, to the network node and on the first physical random access channel, a first set of requests of radio resources and the radio quality of the second radio link, and, in absence of a feedback of the network node at the second network device about said first set of requests of radio resources:

causing the second network device to transmit subsequent requests of radio resources following the first set of requests of radio resources to the network node on the first physical random access channel, causing the first network device to intercept said subsequent requests of radio resources, and determining the radio quality of the third radio link based on the quality of the intercepted subsequent requests of radio resources.

7. The method according to claim 1, wherein the network node acts as serving network node also for the second network device, and wherein said configuring the second network device to transmit the second data to the first network device over the third radio link and the first network device to retransmit, over the first radio link, said second data to the network node further comprises:

causing the network node to send a first resource assignment message to the first network device and a second resource assignment message to the second network device;

causing the first network device to transmit periodically the second synchronization signals, and causing the second network device to synchronize with the first network device according to the received second synchronization signals.

8. The method according to claim 7, wherein the second resource assignment message also contains the information on reserved radio resources that are reserved for Downlink and Uplink data transmission on the third radio link.

9. The method according to claim 1, wherein the wireless network comprises a further network node, the further network node acting as serving network node for the second network device, and wherein the method further comprises causing the network node to inform the further network node about the availability of the first network device to which the second network device can transmit the second data over the third radio link.

10. The method to claim 9, wherein said configuring the second network device to transmit the second data to the first network device over the third radio link and the first network device to retransmit, over the first radio link, said second data to the network node further comprises:

causing the network node to send a resource assignment message to the first network device, causing the further network node to send a resource redirection message to the second network device;

causing the first network device to transmit periodically the second synchronization signals, and causing the second network device to synchronize with the first network device according to the received second synchronization signals.

11. The method according to claim 1, further comprising determining an energy availability of the first network device and an energy availability of the second network device, wherein said configuring the second network device to transmit the second data to the first network device over the third radio link and the first network device to retransmit, over the first radio link, said second data to the network node is carried out if the energy availability of the first network device is higher than the energy availability of the second network device.

12. The method according to claim 1, wherein said configuring the second network device to transmit the second data to the first network device over the third radio link and the first network device to retransmit, over the first radio link, said second data to the network node is carried out also based on at least one among:

an indication of a device network to which the first and second network devices belong;

an indication of a maximum transmitting power supported by the first and second network devices;

an indication about predefined transmission time periods of the first and second network devices; and an indication of position and mobility of the first and second network devices.

13. A network node for use in a wireless network, wherein the wireless network comprises a network node and a first network device under coverage of the network node, the network node acting as serving network node for the first network device, and the first network device being arranged for transmitting first data to the network node over a first radio link, wherein the network node is arranged for:

determining the presence of a second network device under coverage of said network node, the second network device being arranged for transmitting second data to a respective serving network node over a second radio link, determining a radio quality of the first radio link, determining a radio quality of the second radio link, determining a radio quality of a third radio link between the second network device and the first network device, and in response to the radio quality of the third radio link being higher than the radio quality of the second radio link, configuring the second network device to transmit the second data to the first network device over the third radio link and the first network device to retransmit, over the first radio link, said second data to the network node, the wireless network supports first synchronization signals and a first physical random access channel for establishing a direct connection between the first network device and the network node and between the second network device and the respective serving network node, and second synchronization signals and a second physical random access channel for establishing a direct connection between the first network device and the second network device, and wherein said configuring the second network device to transmit the second data to the first network device over the third radio link and the first network device to retransmit, over the first radio link, said second data to the network node is carried out if the first network device supports at least transmission of the second synchronization signals and reception on the second physical random access channel, and the second network device supports at least transmission on the first physical random access channel and on the second physical random access channel and reception of the second synchronization signals.

14. A device network for use in a wireless network, wherein the device network comprises a first network device arranged for transmitting first data over a first radio link, and a second network device arranged for transmitting second data over a second radio link, wherein with the first and second network devices under coverage of a network node of the cellular network, and with the network node acting as serving network node for the first network device:

in response to the radio quality of the third radio link being higher than the radio quality of the second radio link, the second network device is arranged for transmitting the second data to the first network device over the third radio link and the first network device is arranged for retransmitting, over the first radio link, said second data to the network node, wherein the wireless network supports first synchronization signals and a first physical random access channel for establishing a direct connection between the first network device and the network node and between the second network device and the respective serving network node, and second synchronization signals and a second physical random access channel for establishing a direct connection between the first network device and the second network device, and wherein said arranging the second network device for transmitting the second data to the first network device over the third radio link and the first network device to retransmit, over the first radio link, said second data to the network node is carried out if the first network device supports at least transmission of the second synchronization signals and reception on the second physical random access channel, and the second network device supports at least transmission on the first physical random access channel and on the second physical random access channel and reception of the second synchronization signals.

* * * * *